(12) United States Patent
Tsukamoto et al.

(10) Patent No.: US 9,812,230 B2
(45) Date of Patent: Nov. 7, 2017

(54) SHEATH MEMBER (71) Applicant: YAZAKI CORPORATION, Tokyo (JP)

(72) Inventors: Masashi Tsukamoto, Shizuoka (JP); Masataka Yamamoto, Shizuoka (JP); Yasusada Oishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/010,092

(22) Filed: Jan. 29, 2016

(65) Prior Publication Data

US 2016/0148721 A1 May 26, 2016

Related U.S. Application Data (63) Continuation of application No. PCT/JP2014/072482, filed on Aug. 27, 2014.

(30) Foreign Application Priority Data

Aug. 28, 2013 (JP) .................................. 2013-177046

(51) Int. Cl.
*H01B 7/17* (2006.01)
*H02G 3/04* (2006.01)
*B29C 45/14* (2006.01)

(52) U.S. Cl.
CPC .......... *H01B 7/17* (2013.01); *B29C 45/14221* (2013.01); *B29C 45/14549* (2013.01); *H02G 3/0406* (2013.01); *H02G 3/0468* (2013.01); *B29C 45/14467* (2013.01); *B29C 2045/14229* (2013.01)

(58) Field of Classification Search
USPC .......................................... 138/109; 174/135
See application file for complete search history.

(56) References Cited

U.S. PATENT DOCUMENTS

| 5,305,799 A * | 4/1994 | Dal Palu ................. F16L 11/11 138/109 |
| 2004/0187947 A1 | 9/2004 | Heo et al. |
| 2016/0148722 A1* | 5/2016 | Hagi .................... H02G 3/0468 174/128.1 |

FOREIGN PATENT DOCUMENTS

| CN | 1534131 A | 10/2004 |
| CN | 101425664 A | 5/2009 |
| CN | 202997438 U | 6/2013 |
| JP | 62-33113 U | 2/1987 |
| JP | 2001-132871 A | 5/2001 |
| JP | 2004-357415 A | 12/2004 |
| JP | 2007-104787 A | 4/2007 |

(Continued)

OTHER PUBLICATIONS

International Search Report and Written Opinion of the International Search Report for PCT/JP2014/072482 dated Nov. 18, 2014.

(Continued)

*Primary Examiner* — Dhirubhai R Patel
(74) *Attorney, Agent, or Firm* — Kenealy Vaidya LLP (57) ABSTRACT

A sheath member has a cylindrical and flexible main body to accommodate an electric wire and a deformation restricting portion molded on an outer peripheral side of the main body and extending over a predetermined shape maintaining range such that the main body is maintained in a desired routing shape.

8 Claims, 12 Drawing Sheets (56) References Cited

FOREIGN PATENT DOCUMENTS

JP         2012-97880 A     5/2012
JP         2012-217295 A   11/2012

OTHER PUBLICATIONS

Japanese Office Action for the related Japanese Patent Application No. 2013-177046 dated Apr. 13, 2017.
Chinese Office Action for the related Chinese Patent Application No. 201480047814.9 dated Jan. 24, 2017.
English language Written Opinion of the International Search Report for PCT/JP2014/072482 dated Nov. 18, 2014.
Chinese Office Action for the related Chinese Patent Application No. 201480047814.9 dated Jul. 14, 2017.

\* cited by examiner

SHEATH MEMBER

CROSS REFERENCE TO RELATED APPLICATIONS

This application is a continuation of International Patent Application No. PCT/JP2014/072482 filed on Aug. 27, 2014, claiming priority from Japanese Patent Application No. 2013-177046 filed on Aug. 28, 2013, the contents of which are incorporated herein by reference.

FIELD OF INVENTION

The present invention relates to a sheath member.

BACKGROUND ART

Automobiles and the like are provided with wire harnesses that are routed to supply electric power from a battery and the like and to transmit control signals from controllers to various electronic devices mounted thereon. Some of such wire harnesses have various sheath members, such as protectors and corrugated tubes, to accommodate and to protect electric wires (see, e.g., JP2012-217295A and JP2004-357415A).

JP2012-217295A discloses a corrugated tube having a clamp to be engaged with a mounting hole in a vehicle body panel. After a wire harness is inserted, the corrugated tube is fastened to the vehicle body panel using the clamp. The wire harness is thus routed to a predetermined routing position. In this case, since the corrugated tube has flexibility, the routing shape of the wire harness is easily deformed at portions other than the position of the corrugated tube fastened using the clamp. For this reason, the corrugated tube is not suited for a case in which a wire harness is required to be routed in a desired routing shape.

JP2004-357415A discloses a configuration in which a protector molded into a predetermined shape is fastened to a vehicle body to hold electric wires in the molded protector so that a wire harness is routed in a desired routing shape. However, in this case, a plurality of special-purpose protectors corresponding to routing shapes are required to be prepared, resulting in high cost.

SUMMARY OF INVENTION

Illustrative aspects of the present invention provide a sheath member capable of allowing a wire harness to be routed in a desired routing shape at low cost.

(1) According to an illustrative aspect of the present invention, a sheath member includes a cylindrical and flexible main body to accommodate an electric wire, and a deformation restricting portion molded on an outer peripheral side of the main body and extending over a predetermined shape maintaining range along a longitudinal direction of the main body such that the main body is maintained in a desired routing shape.

(2) The shape maintaining range may include a bent section of the main body.

(3) The deformation restricting portion may have an outer shape corresponding to a shape of a contacting object that is brought into contact with the sheath member when the electric wire is routed.

(4) The thickness of the deformation restricting portion in a first direction in a cross section of the deformation restricting portion may be greater than the thickness in a second direction perpendicular to the first direction.

(5) The main body may have a first body portion and a second body portion that are formed as separate pieces, and the deformation restricting portion may extend to bridge the first body portion and the second body portion.

With the sheath member according to (1) described above, the rigidity in the shape maintaining range of the main body is improved by the deformation restricting portion. Hence, the deformation of the main body in the shape maintaining range is restricted and the shape of the main body is easily maintained in a desired routing shape. Consequently, the electric wires are held inside the sheath member, whereby the wire harness can be routed in a desired routing shape. In addition, the sheath member can be produced by performing secondary molding using the main body having flexibility, whereby such a special-purpose protector having been used conventionally is not required to be prepared and cost reduction can be achieved. In other words, for example, only the main body having a straight line shape (not necessarily required to have a straight line shape) is prepared and provided with a deformation restricting portion as necessary by molding depending on the routing shape of the wire harness, whereby a sheath member for routing the wire harness in a desired routing shape can be obtained. For example, it is assumed that a configuration is used in which the deformation restricting portion is provided at a portion that is desired to be formed into a straight line shape and the deformation restricting portion is not provided at a portion that is desired to be bendable. Alternatively, it is assumed that a configuration is used in which the deformation restricting portion is provided at a bent section to maintain a predetermined bent shape and the deformation restricting portion is not provided at a straight section. Furthermore, it is assumed that a configuration is used in which the deformation restricting portion is provided for both the straight section and the bent section.

Moreover, the sheath member may further have a fastening section, such as a clamp, and fastened to the vehicle body during the routing of the wire harness or may be fastened to the vehicle body using a separate mounting member. Alternatively, there can be a case in which the wire harness is fastened to the vehicle body at a different position and not fastened to the vehicle body at the sheath member. As the main body, for example, a corrugated tube or a straight tube having no convex and concave sections on the surface thereof can be used. The deformation restricting portion may be integrated with the main body, or the deformation restricting portion may not be necessarily required to be fastened to the main body, provided that the deformation restricting portion is engaged with the main body in a state in which the movement of the deformation restricting portion in the longitudinal direction of the main body is restricted.

With the sheath member according to (2) described above, the deformation of the bent section of the main body is restricted. There can be a case in which it is preferable that the deformation at the bent section of the main body is restricted depending on the routing state of the wire harness.

With the sheath member according to (3) described above, the outer shape of the deformation restricting portion corresponds to the shape of an object (for example, the mounting surface of a vehicle panel) to be made contact therewith. Hence, wobbling and flapping can be prevented after the routing of the wire harness. In other words, in the foregoing conventional fastening method using a corrugated tube, the cross section of the corrugated tube as viewed in the longitudinal direction is generally formed into a nearly circular shape, whereby the corrugated tube is liable to roll.

Hence, the wire harness is not held stably and wobbling and flapping may occur after the routing of the wire harness. If wobbling and flapping occur, noise may be generated or breakage due to fatigue may be caused. On the other hand, with the sheath member according to (3) described above, the sheath member is routed along the contacting object such that it is firmly attached to the contacting object, whereby the force for holding the wire harness is increased and wobbling and flapping can be prevented.

With the sheath member according to (4) described above, the thickness of the deformation restricting portion in the first direction is made large, whereby the bending rigidity of the sheath member in the first direction is improved. Hence, the sheath member is hardly bent in the first direction. Consequently, when the wire harness is bent after routing, the wire harness is prevented from being bent in an unintended direction. For example, in the case of a wire harness that is used for the connection between members moving relatively to each other, such as sliding sections, the wire harness is required to bend appropriately so as to absorb the extra length thereof. In this case, if the wire harness bends in a direction different from its intended bending direction, the wire harness may be caught or the sheath member may be worn. On the other hand, with the sheath member according to (4) described above, the sheath member is restricted from being bent in the direction in which the bending is restricted, whereby the wire harness is prevented from being bent in an unintended direction and prevented from being caught and worn. Furthermore, since the wire harness can be restricted from bending in a specific direction, the number of positions to be fastened using fastening sections (for example, clamps) can be reduced. The sheath member according to (4) described above may be configured such that the deformation restricting portion is formed to extend in both the first direction and the second direction and the thickness in the first direction is greater than the thickness in the second direction or may be configured such that the deformation restricting portion does not extend in the second direction. In other words, the "thickness" in (4) described above includes a case in which the deformation restricting portion does not extend in the direction described above (includes a case in which the thickness is zero).

With the sheath member according to (5) described above, the deformation restricting portion can restrict the deformation in the vicinity of the connection section between the first body portion and the second body portion being formed separately while the connection is maintained. Hence, for example, a sheath member having a desired length can be obtained by using the first body portion and the second body portion having relatively short lengths. Moreover, it may be possible to use a configuration in which the first body portion and the second body portion are connected so that a space is formed therebetween and the electric wires are branched from the connection section.

ADVANTAGE OF INVENTION

The present invention can provide a sheath member capable of allowing a wire harness to be routed in a desired routing shape at low cost.

The present invention has been briefly described above. The details of the present invention will be further clarified by reading through the following description of modes for carrying out the invention (hereafter "embodiments") with reference to the accompanying drawings.

EMBODIMENTS OF INVENTION

Figure 1:
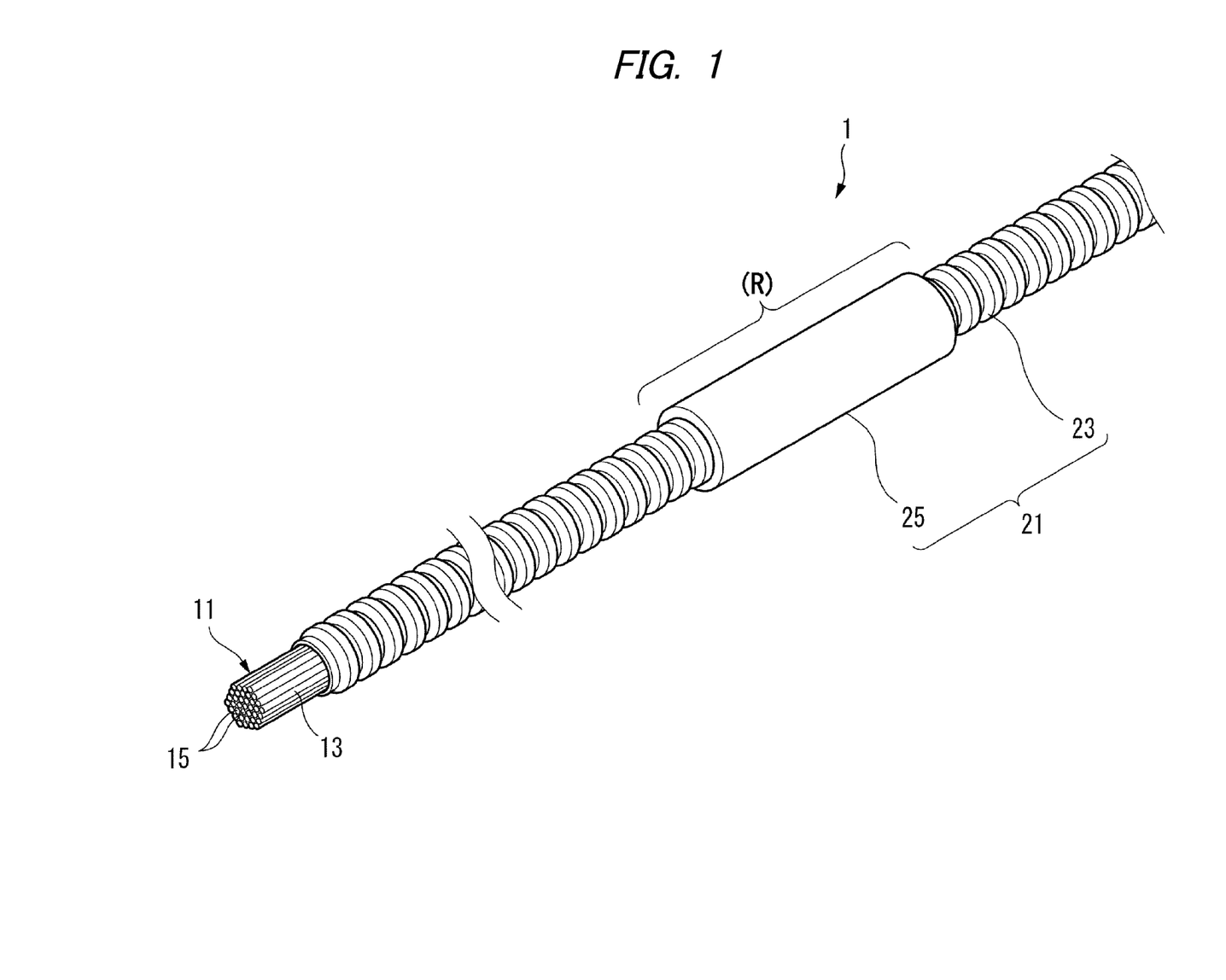
FIG. 1 is a perspective view showing a wire harness according to a first embodiment of the present invention.

A wire harness according to a first embodiment of the present invention will be described below with reference to FIGS. 1 to 5. FIG. 1 is a perspective view showing the wire harness according to the first embodiment of the present invention.

As shown in FIG. 1, a wire harness 1 according to the first embodiment has an electric wire bundle 11 in which a plurality of electric wires 15 are collected in a bundle form and a sheath member 21 covering part of the electric wire bundle 11 in the longitudinal direction thereof.

The electric wire bundle 11 is configured such that the electric wires 15, each having a conductive core wire (not shown) and an insulating coating 13 made of a synthetic resin and covering the outer periphery of the core wire, are collected in a bundle form. The electric wire bundle 11 is bundled with an adhesive tape, such as a wire harness tape (not shown). However, the electric wire bundle 11 may be configured such that the plurality of electric wires 15 are twisted and collected in a bundle form. Furthermore, a single electric wire may be used instead of the electric wire bundle 11.

Figure 2:
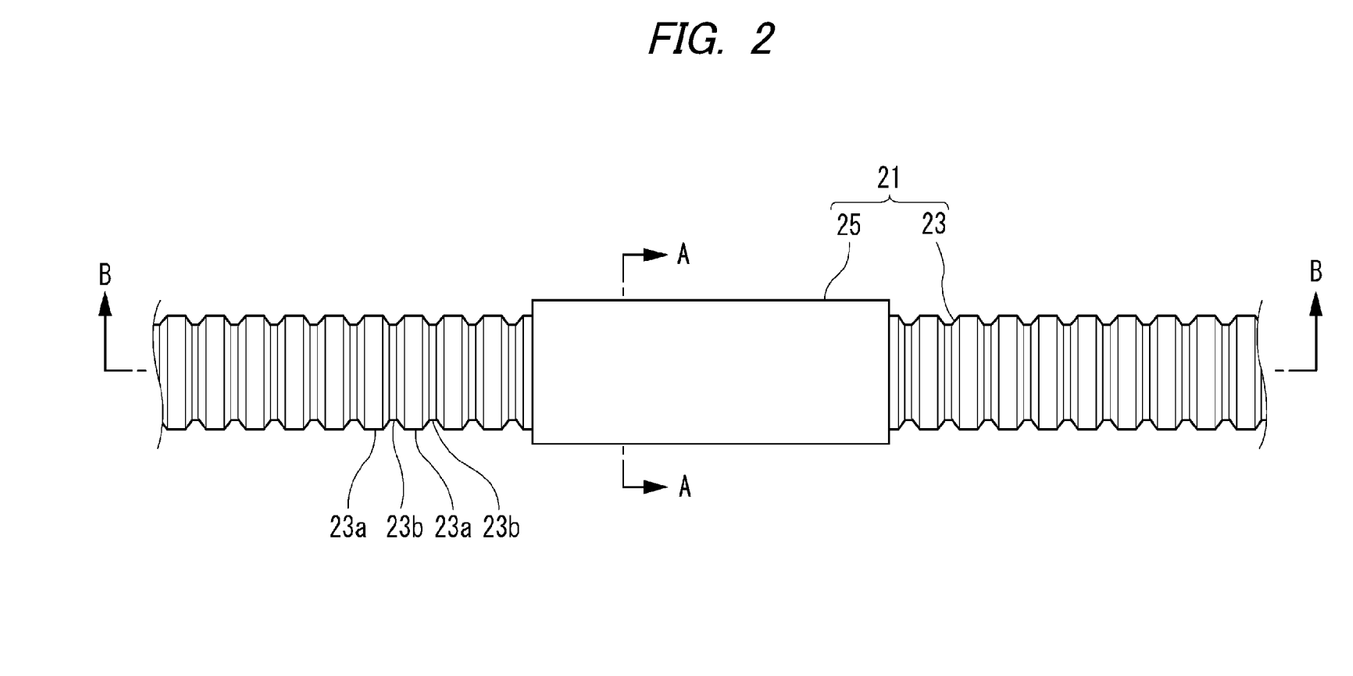
FIG. 2 is a side view showing the sheath member shown in FIG. 1.
Figure 3:
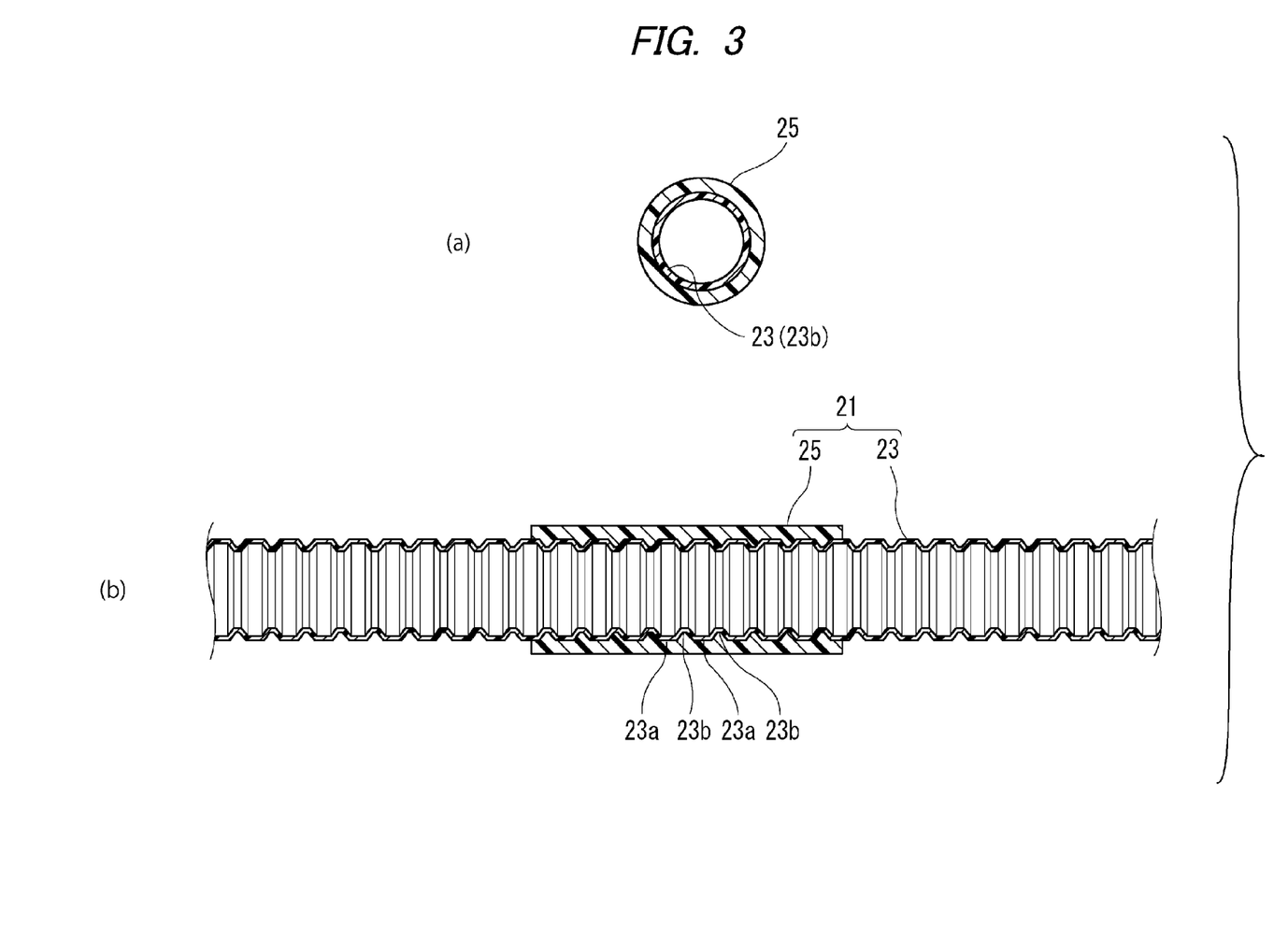
FIG. 3 illustrates cross sections of the sheath member and includes (a) a cross-sectional view taken along the line A-A of FIG. 2, and (b) a cross-sectional view taken along the line B-B of FIG. 2.

As shown in FIGS. 2 and 3, the sheath member 21 includes a flexible and cylindrical main body 23 and a deformation restricting portion 25 provided on the outer peripheral side of the main body 23.

The main body 23 has a cylindrical shape, both ends of which are open, and is a so-called corrugated tube, on the outer peripheral face of which a convex sections 23a and a concave sections 23b are provided alternately and repeatedly in the longitudinal direction. The electric wire bundle 11 is inserted into the main body 23 through the opening on one end side thereof in the longitudinal direction. Furthermore, part of the electric wire bundle 11 is accommodated inside the main body 23. The main body 23 being made of a synthetic resin, such as polypropylene, is formed into a cylindrical shape and has flexibility.

The deformation restricting portion 25 being made of a synthetic resin, such as polypropylene, is fastened to the outer peripheral face of the main body 23 and integrated with the main body 23 by low pressure injection molding (molding) using a micro molding machine described later. As shown in (a) of FIG. 3, the deformation restricting portion 25 has a ring shape in a cross section as viewed from the longitudinal direction, and the thickness thereof is greater than that of the main body 23. In other words, the deformation restricting portion 25 is formed so that the cross-sectional secondary moment thereof is greater than that of the main body 23, whereby the bending rigidity thereof is greater than that of the main body 23. Moreover, as shown in (b) of FIG. 3, the deformation restricting portion 25 is formed so as to extend over a predetermined shape maintaining range (R) (see FIG. 1) in the longitudinal direction of the main body 23. The deformation restricting portion 25 is fastened to the outer peripheral face of the main body 23 over the shape maintaining range (R). In the first embodiment, the deformation restricting portion 25 is provided so as to cover the straight portion of the main body 23.

Figure 4:
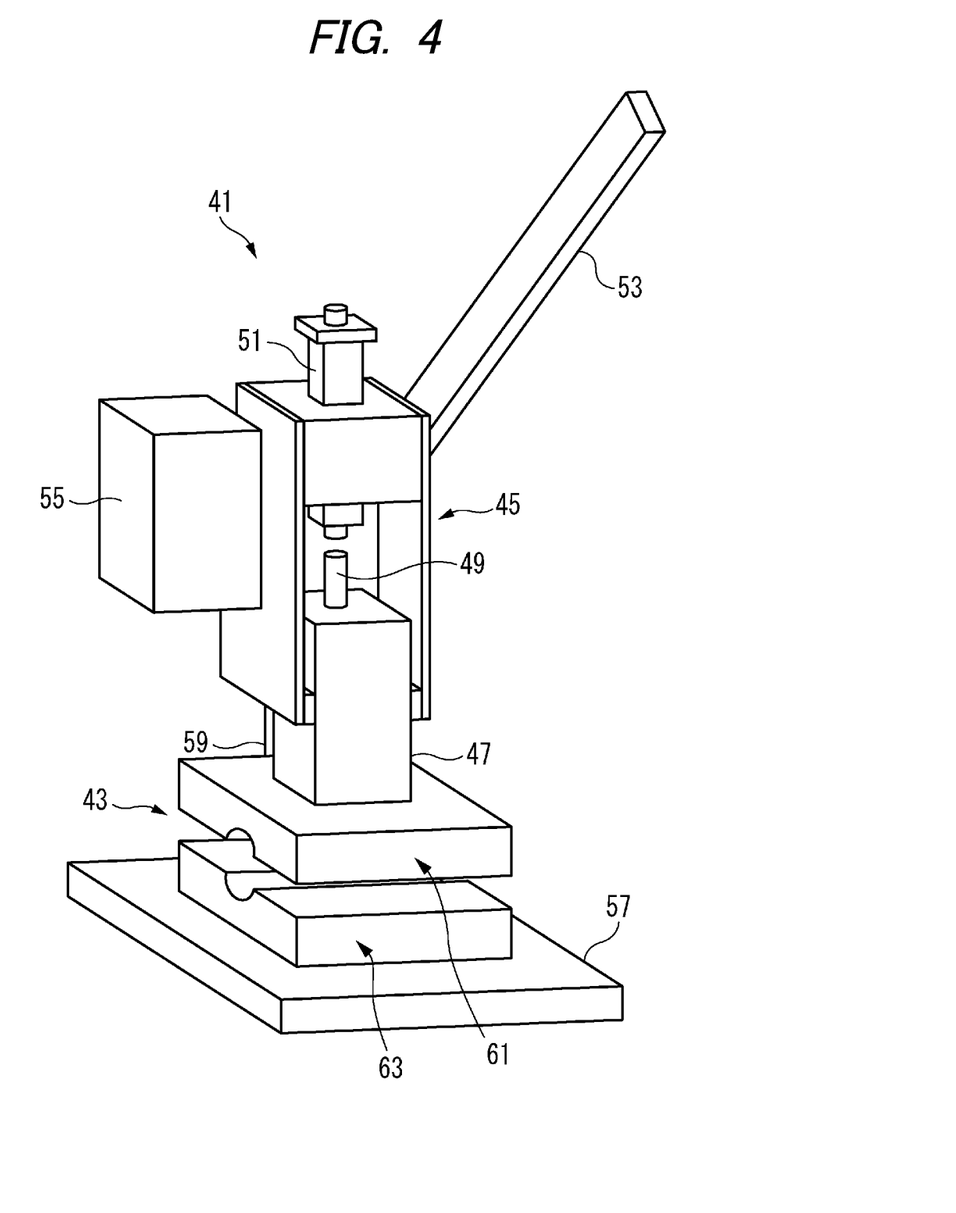
FIG. 4 is an overall perspective view showing a micro molding machine.
Figure 5:
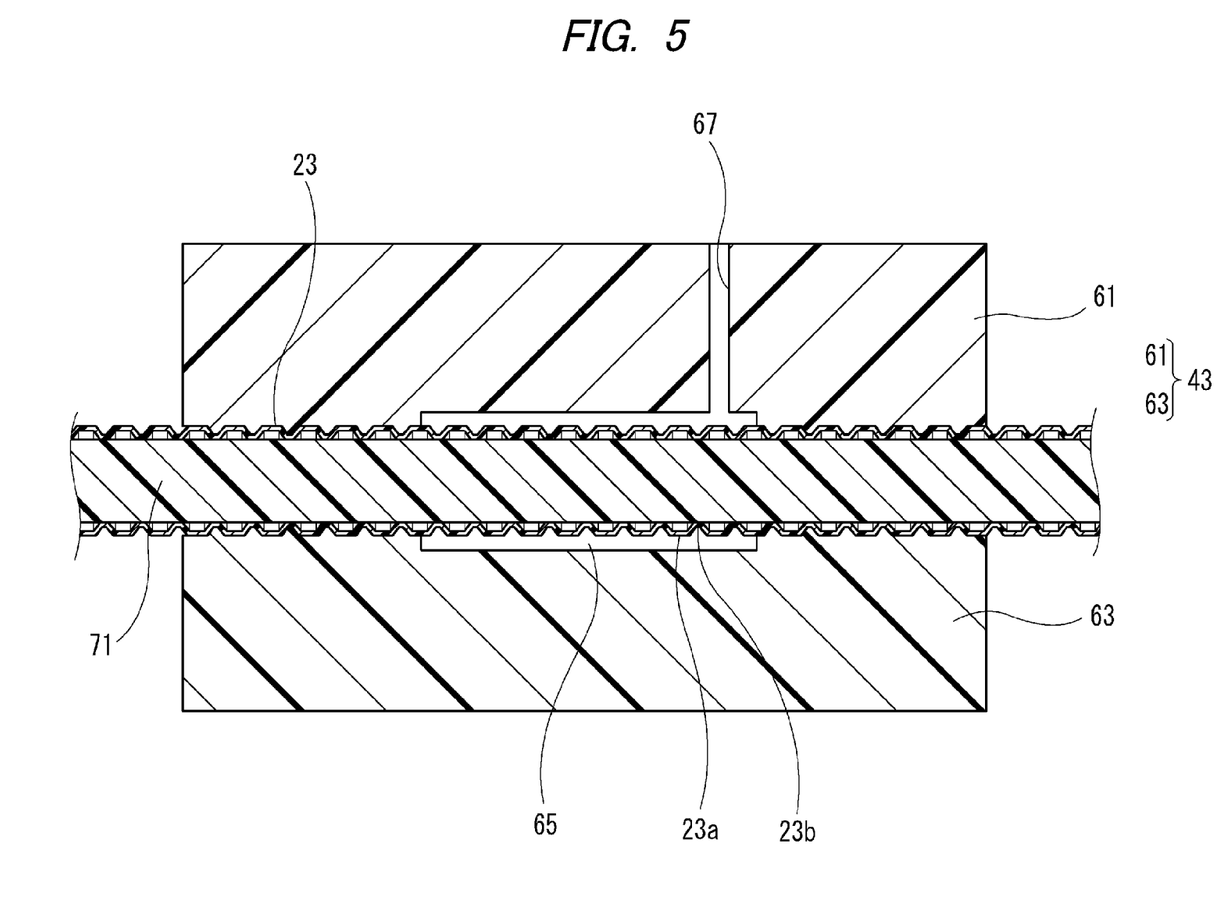
FIG. 5 is a vertical cross-sectional view showing the main body, forming mold and core of the machine after mold clamping.

Next, a method of producing the sheath member 21 using a micro molding machine will be described referred to FIGS. 4 and 5. FIG. 4 is an overall perspective view showing the micro molding machine, and FIG. 5 is a vertical cross-sectional view showing the main body, forming mold and core of the machine after mold clamping.

The method of producing the sheath member 21 according to the first embodiment includes a mold clamping step for clamping a forming mold 43 so that the main body 23 is disposed inside the forming mold 43 and a cavity 65 is formed inside the forming mold 43 and an injecting step for injecting a molten synthetic resin into the cavity 65 at low pressure. The synthetic resin having been injected and filled into the cavity 65 is cooled and solidified, and then the sheath member 21 having been molded is taken out from the forming mold 43. The forming mold 43 is composed of an upper mold 61 and a lower mold 63.

As shown in FIG. 4, a micro molding machine 41 for integrally molding the deformation restricting portion 25 on the main body 23 is a molding machine that can be operated by a single operator without using any external driving device such as an electric motor and is composed of the forming mold 43 made of a synthetic resin, a mold clamping device, not shown, and a low pressure injection device 45 for pressure injecting a molten resin into the forming mold 43.

The low pressure injection device 45 has a heating cylinder 47 provided with a heater for heating and melting, for example, a synthetic resin such as polypropylene; a plunger 49 for injecting the molten resin inside the heating cylinder 47 through a nozzle, not shown; an injection cylinder 51 for moving the plunder 49 forward; a handle 53 for driving the injection cylinder 51; and a temperature controller 55 for keeping the heating temperature of the heating cylinder 47 at a desired temperature, and these components are supported by a device support 59 standing upright on a pedestal 57.

The micro molding machine according to this embodiment is a machine in which the amount of a resin that can be molded by a single injection molding process is up to approximately 10 g and the mold clamping of the forming mold 43 can be carried out manually using an air cylinder or a link mechanism, for example. Hence, the injection cylinder 51 of the low pressure injection device 45 may be driven by an external driving device, such as an electric motor or a pneumatic device. The injecting molding apparatuses disclosed, for example, in JP-A-2010-260297 and JP-A-2012-30429 can be used as the micro molding machine 41.

As shown in FIG. 5, the main body 23 is mold clamped by the forming mold 43 in a state in which a core 71 is inserted into the main body 23 at the mold clamping step. Hence, the cavity 65 is formed inside the forming mold 43. The core 71 (center rod) is formed into solid rod shape, and its outside diameter is nearly equal to the inside diameter of the concave sections 23b of the main body 23. The core 71 prevents the main body 23 from being crushed and deformed during molding. The upper mold 61 has a gate 67 for communicating the cavity 65 with the nozzle of the low pressure injection device 45.

At the injecting step following the mold clamping step, the molten synthetic resin (not shown) is injected at low pressure from the gate 67. Consequently, the molten resin is filled into the cavity 65. The sheath member 21 according to the first embodiment is produced by the production method including the steps described above.

The operational advantages of the sheath member 21 according to the first embodiment will be described below. The sheath member 21 has the deformation restricting portion 25 extending over the shape maintaining range (R) of the main body 23. Hence, the rigidity in the shape maintaining range (R) of the main body 23 is improved by the deformation restricting portion 25. As a result, the deformation of the main body 23 in the shape maintaining range (R) is restricted and the shape of the main body 23 is maintained in a desired routing shape. In other words, a case in which the main body 23 is required to be maintained in a straight line shape in the shape maintaining range (R) is assumed in the first embodiment. Hence, the wire harness 1 can be routed in a desired routing shape by holding the electric wire bundle 11 inside the sheath member 21. In addition, the sheath member 21 can be produced by performing secondary molding using the main body 23 having flexibility, such as a known corrugated tube or straight tube, whereby such a special-purpose protector having been used conventionally is not required to be prepared and cost reduction can be achieved.

Figure 6:
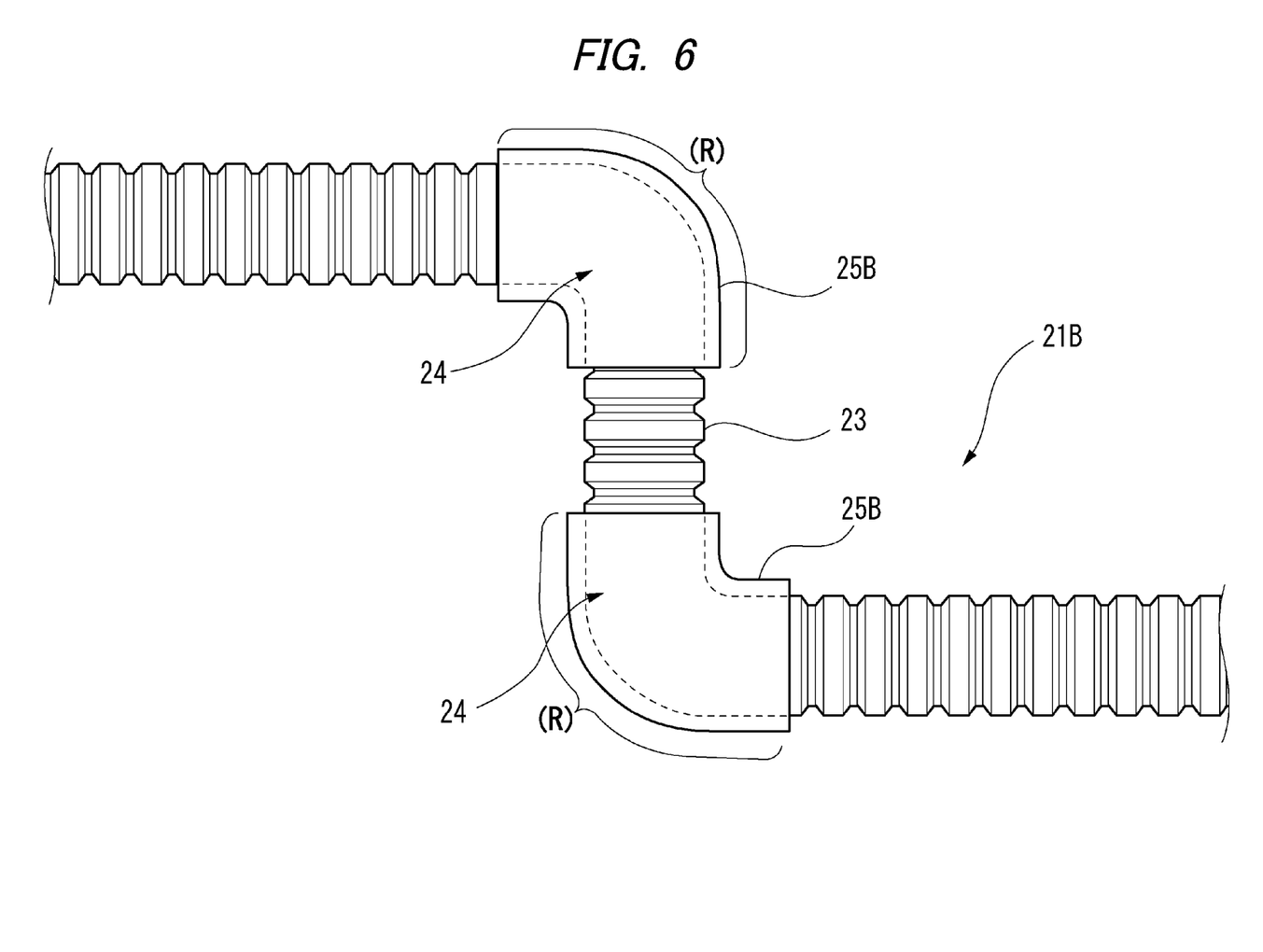
FIG. 6 is a side view showing a sheath member according to a second embodiment of the present invention.

A sheath member 21B according to a second embodiment of the present invention will be described with reference to FIG. 6. FIG. 6 is a side view showing the sheath member according to the second embodiment. As shown in FIG. 6, the sheath member 21B according to the second embodiment is different from the sheath member 21 according to the first embodiment described above in that deformation restricting portions 25B are formed at the bent sections 24 of the main body 23. Since the sheath member 21B is the same as the a sheath member 21 described above in other aspects, the same components are designated by the same reference numerals and their descriptions are omitted.

As shown in FIG. 6, the sheath member 21B is provided with the deformation restricting portions 25B at the bent sections 24 of the main body 23. In other words, the shape maintaining range (R) includes the bent sections 24. Hence, the deformation at the bent sections 24 of the main body 23 is restricted. In other words, a case in which the main body 23 is required to be maintained in a bent shape in the shape maintaining range (R) is assumed in the second embodiment. The wire harness can be routed in a desired routing shape by holding the electric wire bundle 11 inside the sheath member 21B. There can be a case in which it is preferable that the deformation at the bent sections 24 of the main body 23 is restricted depending on the routing state of the wire harness.

The sheath member 21B having the configuration described above can be produced by bending the main body 23 having the same straight line shape as that of the main body 23 for use in producing the sheath member 21 according to the above-mentioned first embodiment into a predetermined routing shape, by mold clamping the main body 23 in the bent state, and by molding the deformation restricting portions 25B. Hence, as in the sheath member 21 according to the foregoing first embodiment and the sheath member 21B according to the second embodiment, a sheath member for routing the wire harness in a desired routing shape can be obtained on the basis of the main body 23 having the same straight line shape. Even in the case that the sheath member 21B according to the second embodiment is produced, as in the case that the sheath member 21 according to the foregoing first embodiment is produced, the main body 23 is mold clamped by the forming mold 43 in a state in which the core 71 is inserted into the main body 23 at the mold clamping step. In this case, a core being bent so as to have a shape corresponding to the bent shape of the molded main body 23 is used as the core 71.

Figure 7:
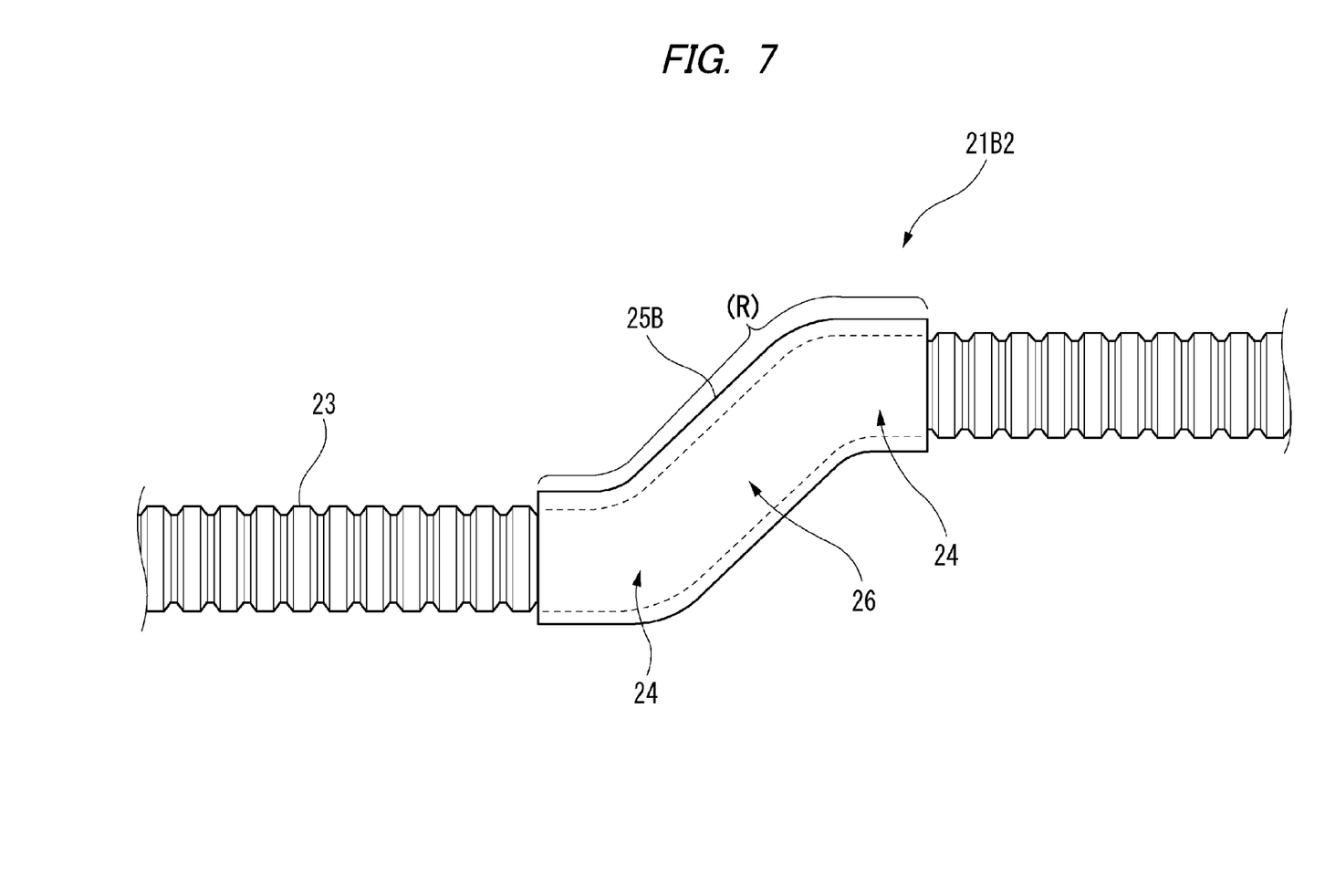
FIG. 7 is a side view showing a sheath member according to a modification of the second embodiment of the present invention.

Furthermore, it is assumed that the sheath member 21B according to the second embodiment shown in FIG. 6 is configured such that the deformation restricting portion is provided in the straight section instead of the bent sections 24. Also in this case, since the deformation of the straight section is restricted, the wire harness can be routed in a desired routing shape. In other words, a complementary relation is held between the case in which the deformation restricting portion is provided on the straight section of the main body 23 as in the first embodiment and the case in which the deformation restricting portions are provided on the bent sections 24 of the main body 23 as in the second embodiment, whereby either one of the configurations can be selectively adopted so as to conform to the mode to be used. Furthermore, as in the case of a sheath member 21B2 according to a modification shown in FIG. 7, the deformation restricting portion 25B may be provided over both the straight section 26 and the bent sections 24. FIG. 7 shows a case in which the main body 23 is bent at an angle greater than a right angle at the bent sections 24.

Figure 8:
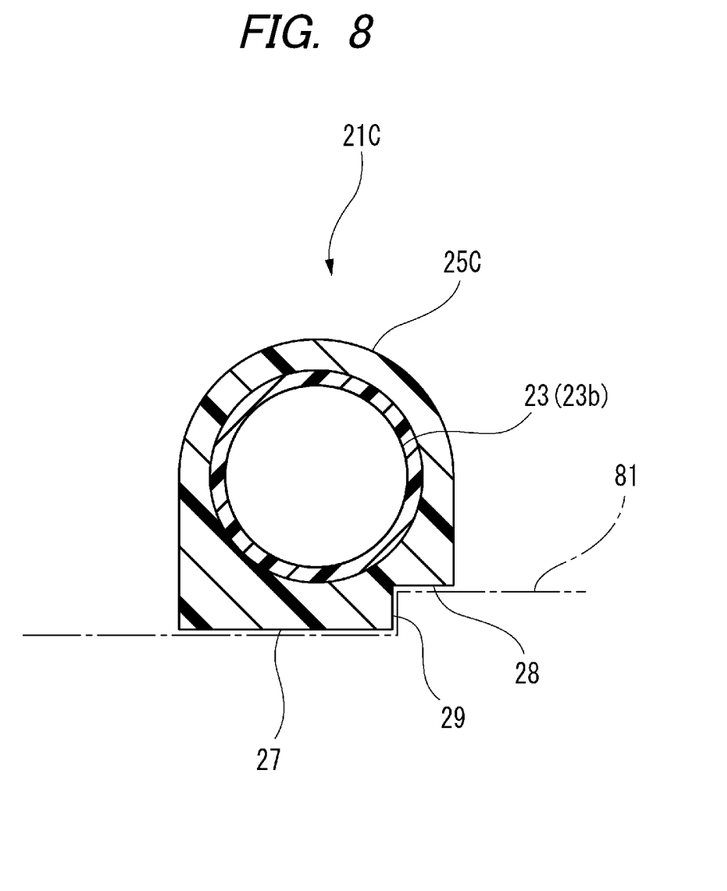
FIG. 8 is a cross-sectional view showing a sheath member according to a third embodiment of the present invention as viewed from the longitudinal direction.

A sheath member 21C according to a third embodiment of the present invention will be described with reference to FIG. 8. FIG. 8 is a cross-sectional view showing the sheath member according to the third embodiment as viewed from the longitudinal direction. As shown in FIG. 8, the sheath member 21C according to the third embodiment is different from the sheath member 21 according to the foregoing first embodiment in the cross-sectional shape of the deformation restricting portion 25C thereof as viewed from the longitudinal direction (see FIG. 3). Since the sheath member 21C is the same as the sheath member 21 according to the first embodiment in other aspects, the same components are designated by the same reference numerals and their descriptions are omitted.

As shown in FIG. 8, the deformation restricting portion 25C of the sheath member 21C has an outer shape corresponding to a shape of a mounting surface 81 of a vehicle panel, the mounting surface 81 being a contacting object that is brought into contact with the sheath member 21C when the wire harness is routed. More specifically, the cross-sectional shape of the deformation restricting portion 25C as viewed from the longitudinal direction corresponds to the shape of the mounting surface 81 and has a first straight section 27, a second straight section 28, and a step section 29 via which the first straight section 27 is connected to the second straight section 28.

With the sheath member 21C according to the third embodiment, the outer shape of the deformation restricting portion 25C corresponds to the shape of the mounting surface 81, the contacting object that is brought into contact with the sheath member 21C, whereby wobbling and flapping can be prevented after the routing of the wire harness. In other words, in the conventional fastening method using a corrugated tube being circular in cross section, the wire harness is not held stably and wobbling and flapping may occur after the routing of the wire harness as described above. If wobbling and flapping occur, noise may be generated or breakage due to fatigue may be caused. On the other hand, with the sheath member 21C, the sheath member 21C is routed along the contacting object such that it is firmly attached to the contacting object, whereby the force for holding the wire harness is increased and wobbling and flapping can be prevented.

Figure 9:
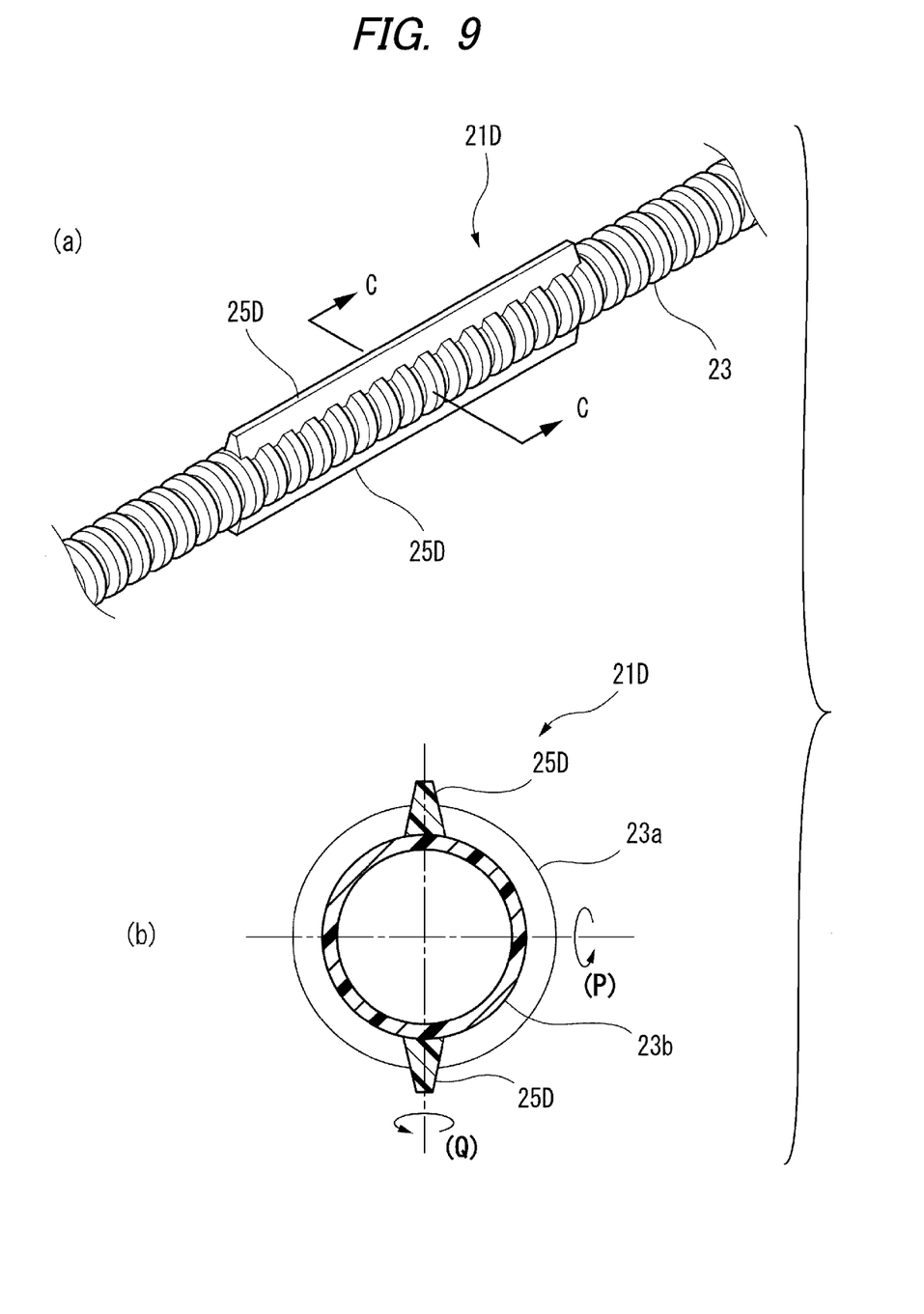
FIG. 9 illustrates a sheath member according to a fourth embodiment of the present invention and includes (a) a perspective view showing the sheath member, and (b) a cross-sectional view taken along the line C-C of (a) of FIG. 9.
Figure 10:
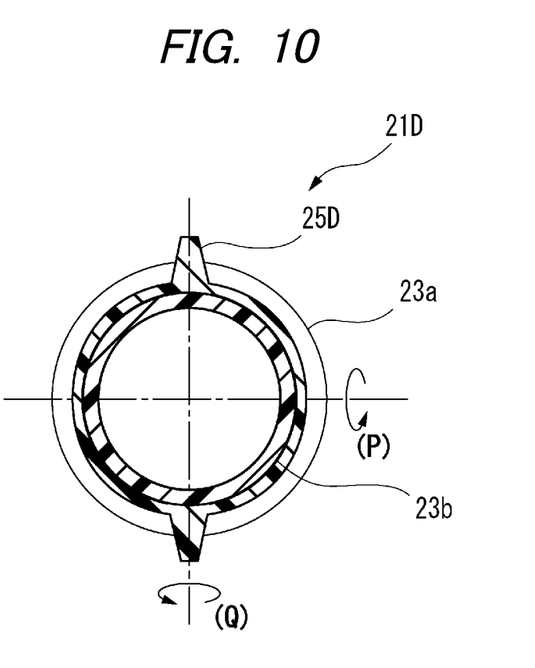
FIG. 10 is a view showing a modification of the sheath member according to the fourth embodiment of the present invention and is a cross-sectional view corresponding to (b) of FIG. 9.

A sheath member 21D according to a fourth embodiment of the present invention will be described with reference to FIGS. 9 to 10. FIG. 9 illustrates the sheath member according to the fourth embodiment and includes (a) a perspective view showing the sheath member, and (b) a cross-sectional view showing the sheath member, taken on line C-C. FIG. 10 is a view showing a modification of the sheath member according to the fourth embodiment and is a cross-sectional view corresponding to (b) of FIG. 9. As shown in FIGS. 9 to and 10, the sheath member 21D according to the fourth embodiment is different from the sheath member 21 according to the first embodiment in the cross-sectional shape of the deformation restricting portion 25C thereof as viewed from the longitudinal direction. Since the sheath member 21D is the same as the sheath member 21 according to the first embodiment in other aspects, the same components are designated by the same reference numerals and their descriptions are omitted.

As shown in (a) and (b) of FIG. 9, the deformation restricting portion 25D of the sheath member 21D is composed of two members; one of the two members extends upward as shown in (b) of FIG. 9 and the other member extends downward as shown in (b) of FIG. 9. Hence, the thickness of the deformation restricting portion 25D in the up-down direction (first direction) in the cross section thereof is greater than the thickness thereof in the left-right direction (second direction) perpendicular to the up-down direction (in the example shown in (a) and (b) of FIG. 9, the deformation restricting portion 25 does not extend in the left-right direction and has no thickness). Hence, the sheath member 21D can be bent in the direction (P) shown in (b) of FIG. 9 but is hardly bent in the direction (Q) shown in the figure. In other words, the bending rigidity of the sheath member 21D in the up-down direction is improved, whereby the sheath member 21D is hardly bent in the up-down direction. Consequently, when the wire harness having been routed is bent, the wire harness can be prevented from being bent in the up-down direction shown in (b) of FIG. 9. In the fourth embodiment, it is assumed that the wire harness is allowed to be bent in the left-right direction (second direction) shown in (b) of FIG. 9 after the routing.

Moreover, as shown in FIG. 10, the deformation restricting portion 25D of the sheath member 21D according to the modification is further provided with a thin section covering the outer peripheral face of the concave sections 23b of the main body 23 in addition to the portions extending in the up-down direction, thereby being configured as a single member. Hence, also in the sheath member 21D according to the modification, the thickness thereof in the up-down direction (first direction) in the cross section thereof is greater than the thickness thereof in the left-right direction (second direction) perpendicular to the up-down direction. Hence, the sheath member 21D according to the modification can be bent in the direction (P) shown in FIG. 10 but is hardly bent in the direction (Q) shown in FIG. 10.

As described above, in the sheath member 21D according to the fourth embodiment shown in FIG. 9 to 10, the thickness of the deformation restricting portion 25D in the first direction in the cross section thereof is greater than the thickness thereof in the second direction, whereby the bending in the first direction is restricted. Hence, the wire harness is prevented from being bent in an unintended direction. Further, since the wire harness can be restricted from being bent in a specific direction, the number of positions to be fastened using fastening sections (for example, clamps) can be reduced. That is, as the sheath member 21D according to the fourth embodiment, not only in the case of the configuration (the sheath member 21D shown in (a) and (b) of FIG. 9) in which the deformation restricting portion 25D is formed so as to extend in both the first direction and the second direction and the thickness in the first direction is greater than the thickness in the second direction but also in the case of the configuration (the sheath member 21D shown in FIG. 10) in which the deformation restricting portion 25D is not extended in the second direction, the wire harness is prevented from being bent in an unintended direction.

Figure 11:
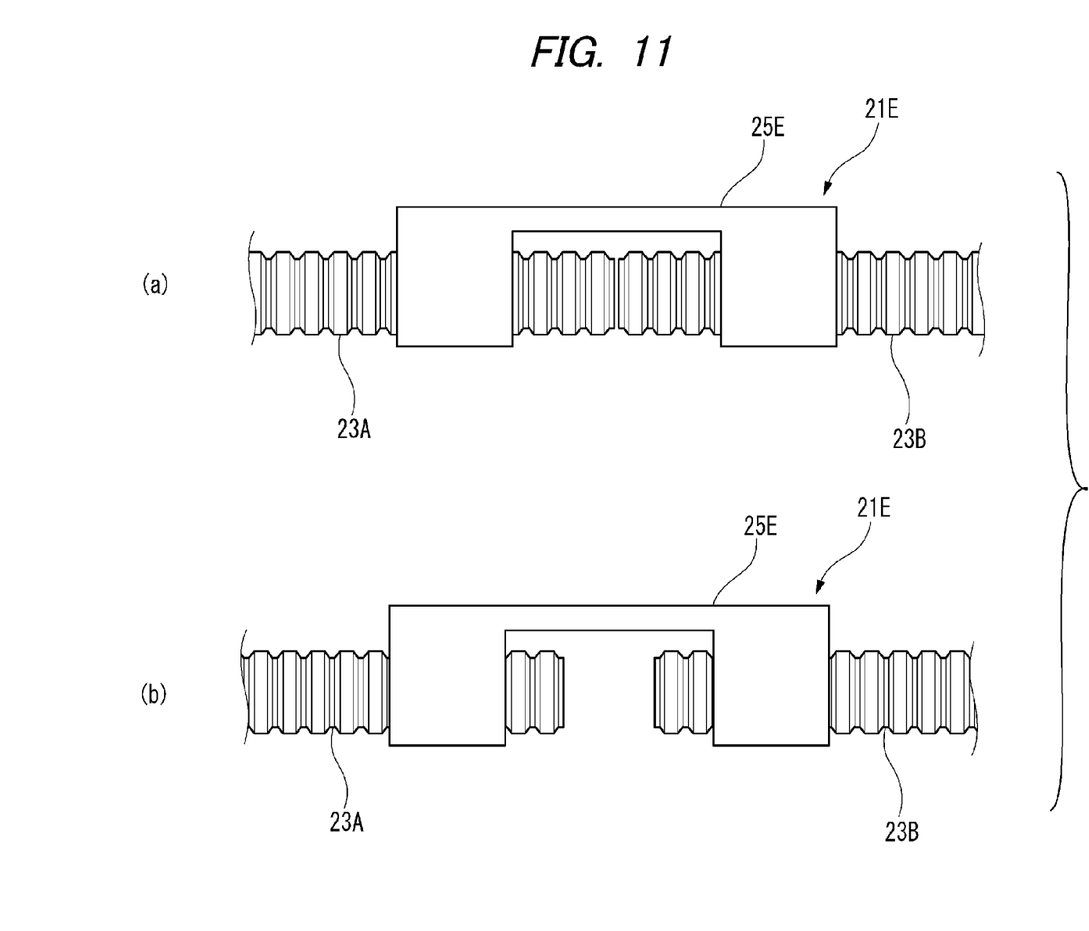
FIG. 11 includes (a) a side view showing a sheath member according to a fifth embodiment of the present invention, and (b) is a side view showing modification 1 of the sheath member according to the fifth embodiment of the present invention.
Figure 12:
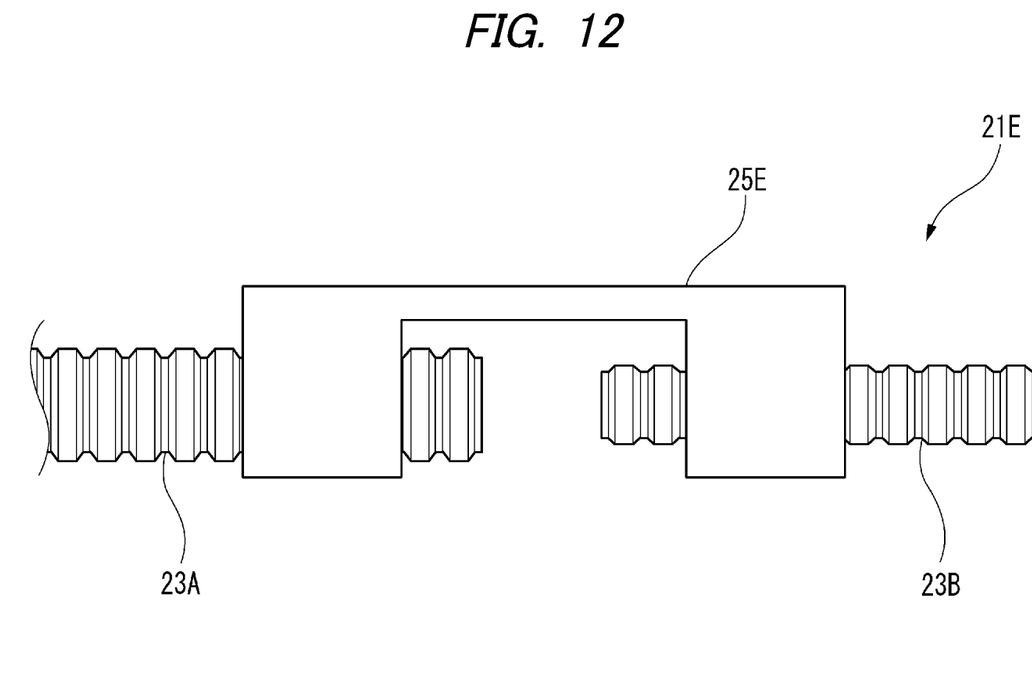
FIG. 12 is a side view showing modification 2 of the sheath member according to the fifth embodiment of the present invention.

A sheath member 21E according to a fifth embodiment of the present invention will be described with reference to FIGS. 11 to 12. FIG. 11 includes (a) a side view showing the sheath member according to the fifth embodiment, and (b) a side view showing modification 1 of the sheath member according to the fifth embodiment. FIG. 12 is a side view showing modification 2 of the sheath member according to the fifth embodiment. As shown in FIGS. 11 to and 12, the sheath member 21E according to the fifth embodiment is different from the sheath member 21 according to the first embodiment in that the deformation restricting portion 25E thereof is formed to bridge two body portions 23 that are formed as separate pieces. Since the sheath member is the same as the sheath member 21 according to the first embodiment in other aspects, the same components are designated by the same reference numerals and their descriptions are omitted.

As shown in FIGS. 11 to 12, to connect the terminal end portions of the two body portions 23 (a first body portion 23A and a second body portion 23B) that are formed as separate pieces, the deformation restricting portion 25E of the sheath member 21E according to the fifth embodiment extends to bridge the first body portion 23A and the second body portion 23B. The deformation restricting portion 25E can restrict the deformation in the vicinity of the connection section between the first body portion 23A and the second body portion 23B while the connection is maintained. Hence, for example, a sheath member having a desired length can be obtained by using the first body portion 23A and the second body portion 23B having relatively short lengths. The connection between the first body portion 23A and the second body portion 23B may be configured such that the first body portion 23A and the second body portion 23B are connected continuously so as to be located close to each other as shown in (a) of FIG. 11 or may be configured such that the first body portion 23A and the second body portion 23B are connected so that a space is formed therebetween as in the cases of modifications 1 and 2 shown respectively in (b) of FIG. 11 and FIG. 12. With the configuration in which such a space is formed between the body portions as in the cases of modifications 1 and 2 shown respectively in (b) of FIG. 11 and FIG. 12, part of the electric wire bundle 11 can be branched from the connection section. In other words, in modifications 1 and 2, the first body portion 23A and the second body portion 23B are connected using the deformation restricting portion 25E so that a space for allowing the electric wire bundle 11 to be branched is formed therebetween. Furthermore, in the case that, when part of the electric wire bundle 11 is branched from the connection section, the wire diameter of the branched wire bundle becomes small, the tube diameter of one (the second body portion 23B in modification 2 shown in FIG. 12) of the two body portions 23 to be connected to each other may be set so as to be smaller than the tube diameter of the other main body (the first body portion 23A in modification 2 shown in FIG. 12) as in modification 2 shown in FIG. 12. In the case that the tube diameter of one of the body portions 23 is set smaller as described above, space saving can be achieved during routing.

The technical scope of the present invention is not limited to the embodiments described above. Various changes and modifications may be made in the embodiments described above within the technical scope of the present invention.

For example, in the respective embodiments described above, the electric wire bundle 11 is inserted through the opening at one end of the main body 23, however, it may be possible to use a configuration in which a slit passing through both the main body 23 and the deformation restricting portion 25 is formed in the longitudinal direction of the main body 23 and the deformation restricting portion 25 and the electric wire bundle 11 is inserted through the slit. The configuration in which the slit is formed is advantageous in that the electric wire bundle 11 is inserted easily. In the case that the slit is formed, a core 71 (center rod) having protrusions on the outer periphery thereof is used during production as shown in FIG. 11 of JP2012-217295A.

Furthermore, in the respective embodiments described above, the deformation restricting portion 25 is fastened to the main body 23, however, the deformation restricting portion 25 is not necessarily required to be fastened to the main body 23, provided that the deformation restricting portion 25 is engaged with the main body 23 in a state in which the movement of the deformation restricting portion 25 in the longitudinal direction of the main body 23 is restricted. For example, it is assumed that there exists a configuration in which the deformation restricting portion 25 is engaged with the main body 23 by restricting the movement of the deformation restricting portion 25 in the longitudinal direction of the main body 23 using flange-shaped engaging sections (or the convex sections 23a) protruding on the outer face of the main body 23.

Moreover, in the respective embodiments described above, the main body 23 and the deformation restricting portion 25 are made of the same material (polypropylene), however, they may be made of different materials. For example, in the case that the deformation restricting portion 25 is made of a material harder than the material of the main body 23, the deformation of the main body 23 can be restricted effectively. In the case that both the members are desired to be fastened firmly to each other, it is preferable that the materials of both the members should be made of materials having relatively high compatibility.

Features of the sheath members 21, 21B, 21C, 21D, 21E according to the embodiments described above will be briefly summarized and listed below.

(1) The sheath member 21 (21B, 21C, 21D, 21E) according to the embodiments described above has a cylindrical and flexible main body 23 to accommodate an electric wire bundle 11 (electric wires). The sheath member 21 (21B, 21C, 21D, 21E) also has a deformation restricting portion 25 (25B, 25C, 25D, 25E) provided on an outer peripheral side of the main body 23 by low pressure injection molding (molding) and extending over a predetermined shape maintaining range (R) along a longitudinal direction of the main body 23 such that the main body 23 is maintained in a desired routing shape.

(2) In the sheath member 21B according to the embodiment described above, the shape maintaining range (R) includes a bent section 24 of the main body 23.

(3) In the sheath member 21C according to the embodiment described above, the deformation restricting portion 25C has an outer shape corresponding to a shape of a contacting object (the mounting surface 81 of a vehicle panel) that is brought into contact with the sheath member 21C when the electric wire bundle 11 is routed.

(4) In the sheath member 21D according to the embodiment described above, a thickness of the deformation restricting portion 25D in a first direction (the up-down direction in (b) of FIG. 9) in a cross section of the deformation restricting portion 25D is greater than the thickness in a second direction (the left-right direction in (b) of FIG. 9) perpendicular to the first direction.

(5) In the sheath member 21E according to the embodiment described above, the main body 23 has a first body portion 23A and a second body portion 23B that are formed as separate pieces, and the deformation restricting portion 25E extends to bridge the first body portion 23A and the second body portion 23B.

What is claimed is:

1. A sheath member comprising:
   a cylindrical and flexible main body being configured to accommodate an electric wire, the main body including a corrugated tube that has an outer peripheral side with a plurality of alternating convex sections and concave sections; and
   a deformation restricting portion engaging at least one of the convex sections and at least one of the concave sections on the outer peripheral side of the corrugated tube, and the deformation restricting portion extending over a predetermined shape maintaining range along a longitudinal direction of the main body such that the main body is maintained in a desired routing shape,
   wherein the main body comprises a first body portion and a second body portion that are formed as separate pieces, and
   wherein the deformation restricting portion extends to bridge the first body portion and the second body portion.

2. The sheath member according to claim 1, wherein the shape maintaining range includes a bent section of the main body.

3. The sheath member according to claim 1, wherein the thickness of the deformation restricting portion in a first direction in a cross section of the deformation restricting portion is greater than the thickness in a second direction perpendicular to the first direction.

4. The sheath member according to claim 1, wherein the deformation restricting portion includes an inner surface that conforms to the concave sections and the convex sections that are located in the predetermined shape maintaining range.

5. The sheath member according to claim 1, wherein the deformation restricting portion includes a bridging portion that is spaced away from the main body and parallels the main body in the longitudinal direction.

6. The sheath member according to claim 1, wherein the main body includes a bent portion and the deformation restricting portion extends along the bent portion.

7. A wire harness comprising:
   at least one electric wire; and
   the sheath member according to claim 1, wherein the main body accommodates a portion of the at least one electric wire.

8. A sheath member comprising:
   a cylindrical and flexible main body to accommodate an electric wire; and
   a deformation restricting portion molded on an outer peripheral side of the main body and extending over a predetermined shape maintaining range along a longitudinal direction of the main body such that the main body is maintained in a desired routing shape,
   wherein the main body comprises a first body portion and a second body portion that are formed as separate pieces,
   wherein the deformation restricting portion extends to bridge the first body portion and the second body portion, and
   wherein the deformation restricting portion has an outer shape corresponding to a shape of a contacting object that is brought into contact with the sheath member when the electric wire is routed.

* * * * *